United States Patent
Bai

(10) Patent No.: US 10,505,578 B2
(45) Date of Patent: Dec. 10, 2019

(54) MULTIWAY SWITCH, RADIO FREQUENCY SYSTEM, AND ELECTRONIC DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/183,717

(22) Filed: Nov. 7, 2018

(65) Prior Publication Data
US 2019/0288734 A1    Sep. 19, 2019

(30) Foreign Application Priority Data
Mar. 16, 2018    (CN) .......................... 2018 1 0220669

(51) Int. Cl.
*H04B 1/00* (2006.01)
*H04B 1/40* (2015.01)
(Continued)

(52) U.S. Cl.
CPC .............. *H04B 1/40* (2013.01); *H04B 1/005* (2013.01); *H04B 7/0404* (2013.01); *H04B 7/0686* (2013.01); *H04W 88/06* (2013.01)

(58) Field of Classification Search
CPC .. G06F 3/033; H01P 1/10; H03H 7/46; H04B 1/00; H04B 1/28; H04B 1/38; H04B 1/40;
(Continued)

(56) References Cited

U.S. PATENT DOCUMENTS 7,633,357 B2 * 12/2009 Hangai ..................... H01P 1/15
                                                         333/103
2009/0054093 A1    2/2009 Kim et al.
(Continued)

FOREIGN PATENT DOCUMENTS

CN    101867402 A    10/2010
CN    202103661 U    1/2012
(Continued)

OTHER PUBLICATIONS

International search report issued in corresponding international application No. PCT/CN2018/113766 dated Jan. 23, 2019.
(Continued)

*Primary Examiner* — Shawkat M Ali
(74) *Attorney, Agent, or Firm* — Young Basile Hanlon & MacFarlane, P.C.

(57) ABSTRACT

A multiway switch, a radio frequency system, and an electronic device are provided. The multiway switch is applicable to an electronic device being operable in a single-frequency dual-transmit mode. The electronic device includes the multiway switch, a radio frequency circuit, and an antenna system. The antenna system includes $2^n$ antennas. The multiway switch includes six T ports and $2^n$ P ports. The six T ports are configured to be coupled with the radio frequency circuit. The $2^n$ P ports are configured to be coupled with the antenna system. The six T ports include two first T ports coupled with all of the $2^n$ P ports. The multiway switch is configured to be coupled with the radio frequency circuit and the antenna system to implement a preset function of transmitting a sounding reference signal (SRS) through the $2^n$ antennas corresponding to the $2^n$ P ports in turn.

18 Claims, 13 Drawing Sheets

(51) Int. Cl.
*H04B 7/0404* (2017.01)
*H04B 7/06* (2006.01)
*H04W 88/06* (2009.01)

(58) Field of Classification Search
CPC . H04B 1/44; H04B 1/48; H04B 1/006; H04B 1/401; H04B 1/403; H04B 7/08; H04B 7/108; H04B 7/185; H04B 7/0413; H04B 7/0602; H04B 7/18582; H04B 7/18584; H04L 5/14; H04L 25/0228; H04W 36/00; H04W 36/34; H04W 36/0027; H04W 40/16; H04W 52/52; H04W 72/12; H04W 88/02; H04W 88/06
USPC ......... 333/101, 103; 370/281; 375/219, 260, 375/262, 267, 295, 316; 455/73, 83, 130, 455/552, 552.1, 557
See application file for complete search history.

(56) References Cited

U.S. PATENT DOCUMENTS

| | | |
|---|---|---|
| 2013/0308477 A1 | 11/2013 | Ning et al. |
| 2013/0308554 A1 | 11/2013 | Ngai et al. |
| 2014/0227982 A1 | 8/2014 | Granger-Jones et al. |
| 2017/0195004 A1 | 7/2017 | Cheng et al. |
| 2018/0205413 A1* | 7/2018 | Patel ................. H03F 3/195 |

FOREIGN PATENT DOCUMENTS

| | | |
|---|---|---|
| CN | 103905104 A | 7/2014 |
| CN | 105245295 A | 1/2016 |
| CN | 106559277 A | 4/2017 |
| CN | 106685621 A | 5/2017 |
| CN | 107733508 A | 2/2018 |
| CN | 108599777 A | 9/2018 |
| WO | 2012026601 A1 | 3/2012 |

OTHER PUBLICATIONS

Gao Xiang et al: "Multi-Switch for Antenna Selection in Massive MIMO", IEEE, Dec. 6, 2015 (Dec. 6, 2015), pp. 1-6.
Guy Lemieux et al: "Generating highly-routable sparse crossbars for PLDs", Feb. 1, 2000 (Feb. 1, 2000), pp. 155-164.
Extended European search report issued in corresponding European application No. 18205243.1 dated May 28, 2019.
Extended European search report issued in corresponding European application No. 18203601.2 dated May 28, 2019.
Gao Xiang et al: "Multi-Switch for Antenna Selection in Massive MIMO" 2015 IEEE Global Communications Conference (Globecom), IEEE, Dec. 6, 2015 (Dec. 6, 2015), pp. 1-6, XPQ32872922, DOI: 10.1109/GLOCOM.2014.7417765; abstract; Sections I, III.B, III.C; figures 1, 2, 5, 6.
Lemieux G et al: "Generating Highly-Routable Sparse Crossbars for PLDS" FPGA'00. ACM/SIGDA International Symposium on Field Programmable Gate Arrays. Monterey, CA, Feb. 9-11, 20; [ACM/SIGDA International Symposium on Field Programmable Gate Arrays], New York, NY: ACM, US, vol. : Conf. 8, Jan. 1, 2000 (Jan. 1, 2000), pp. 155-164, XP008060160, DOI: 10.1145/329166. 329199; ISBN: 978-1-58113-193-2; Section 2; figure 1.

\* cited by examiner

MULTIWAY SWITCH, RADIO FREQUENCY SYSTEM, AND ELECTRONIC DEVICE

CROSS-REFERENCE TO RELATED APPLICATION(S)

This application claims priority to Chinese Patent Application No. 201810220669.X, filed on Mar. 16, 2018, the entire disclosure of which is hereby incorporated by reference.

TECHNICAL FIELD

This disclosure relates to the field of mobile terminal technology, and particularly to a multiway switch, a radio frequency system, and an electronic device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, an electronic device supporting a four-antenna RF system architecture is proposed.

SUMMARY

Implementations of the disclosure provide a multiway switch, a radio frequency system, and an electronic device.

According to a first aspect of implementations of the disclosure, a multiway switch is provided. The multiway switch is applicable to an electronic device. The electronic device is operable in a single-frequency dual-transmit mode. The electronic device includes the multiway switch, a radio frequency circuit, and an antenna system. The multiway switch includes six T ports and $2^n$ P ports. The six T ports are configured to be coupled with the radio frequency circuit. The $2^n$ P ports are configured to be coupled with the antenna system. The six T ports include two first T ports coupled with all of (that is, fully coupled with) the $2^n$ P ports. n is an integer and n≥2.

The multiway switch is configured to be coupled with the radio frequency circuit and the antenna system to implement a preset function of the electronic device. The antenna system includes $2^n$ antennas. The preset function is a function of transmitting a sounding reference signal (SRS) through the $2^n$ antennas corresponding to the $2^n$ P ports in turn (that is, $2^n$-port SRS).

According to a second aspect of implementations of the disclosure, a radio frequency system is provided. The radio frequency system includes an antenna system, a radio frequency circuit, and a multiway switch.

The multiway switch includes six T ports and $2^n$ P ports. The six T ports are configured to be coupled with the radio frequency circuit. The $2^n$ P ports are configured to be coupled with the antenna system. The six T ports include two first T ports coupled with all of (that is, fully coupled with) the $2^n$ P ports. n is an integer and n≥2.

The multiway switch is configured to be coupled with the radio frequency circuit and the antenna system to implement a preset function of the radio frequency system. The antenna system includes $2^n$ antennas. The preset function is a function of transmitting an SRS through the $2^n$ antennas corresponding to the $2^n$ P ports in turn.

According to a third aspect of implementations of the disclosure, an electronic device is provided. The electronic device includes an antenna system, a radio frequency circuit, and the multiway switch described in the first aspect.

The multiway switch includes six T ports and $2^n$ P ports. The six T ports are configured to be coupled with the radio frequency circuit. The $2^n$ P ports are configured to be coupled with the antenna system. The six T ports include two first T ports coupled with all of (that is, fully coupled with) the $2^n$ P ports. n is an integer and n≥2.

The multiway switch is configured to be coupled with the radio frequency circuit and the antenna system to implement a preset function of the electronic device. The antenna system includes $2^n$ antennas. The preset function is a function of transmitting an SRS through the $2^n$ antennas corresponding to the $2^n$ P ports in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1A:
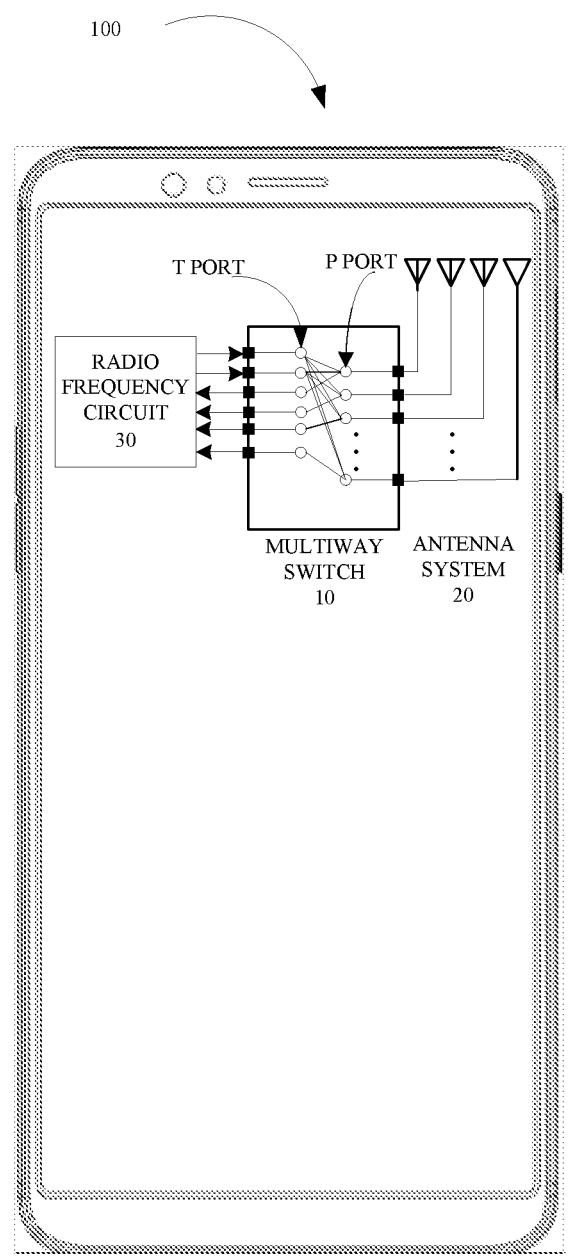
FIG. 1A is a schematic structural diagram illustrating a multiway switch according to an implementation of the disclosure.

In order to illustrate technical solutions of implementations of the present disclosure more clearly, technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed. As an implementation, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The "electronic device" involved in the implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like. For the convenience of description, the above-mentioned devices are collectively referred to as an electronic device.

In order to better understand a multiway switch and related products provided in the implementations of the present disclosure, the following implementations of the present disclosure will be described in detail.

At present, sounding reference signal (SRS) switching in four antennas switching of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink signals of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS switching in four antennas, implementations of the present disclosure provide a radio frequency architecture based on a simplified 4P6T antenna switch. Compared with a 3P3T/DPDT/multiway small switch switching scheme, the present switching scheme can reduce the number of series switches in each path (all or part of switches are integrated into the 4P6T switch), thereby reducing link loss and optimizing the overall transmission and reception performance of the terminal. The implementations of the present disclosure are described in detail below.

The following describes some terms of the disclosure to facilitate understanding of those skilled in the art.

"P port" in the disclosure is the abbreviation of "pole port", which refers to ports coupled with antennas of the multiway switch. "T port" in the disclosure is the abbreviation of "throw port", which refers to ports coupled with radio frequency circuit of the multiway switch. The multiway switch is a 4P4T switch for example, that is, the four P ports are configured to be coupled with the antenna system and the four T ports are configured to be coupled with the radio frequency circuit. "Module" herein can refer to circuits and any combination of related components.

The concept of "coupling", "full coupling (fully coupled)", or other kinds of coupling between the T ports and the P ports of the multiway switch described in the implementations of the disclosure refers to a state in which the T ports are coupled with the P ports through first switch transistors. One T port or one P port may be one port of a second switch transistor. The first switch transistors are configured to control a unidirectional communication between the T ports and the P ports (including a unidirectional communication from the T ports to the P ports and a unidirectional communication from the P ports to the T ports). The first switch transistor can be, for example, a switch array including three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the electronic device can control paths between the T ports and the P ports to switch on through the first switch transistors. As one implementation, the electronic device can be provided with a dedicated controller to be coupled with switch transistors of the multiway switch.

The transmitting a sounding reference signal (SRS) through the four antennas corresponding to the four P ports in turn refers to a process in which the electronic device interacts with a base station based on polling mechanism to determine quality of an uplink channel corresponding to each antenna.

The "transmit-receive port", "transmit port", or "receive port" refers to a port (may be composed of one or more components) which implements a corresponding transmission and/or reception function and is located on the path of a transmitter circuit, on the path of a receive circuit, on the path of after a integration of one or more transmitter circuits and/or one or more receive circuits. It should be noted that the ports such as transmit ports, receive ports, and transmit-receive ports illustrated in the figures are exemplary and do not intent to indicate an exact port position and impose any restriction.

The following implementations of the present disclosure will be described in detail.

FIG. 1A is a schematic structural diagram illustrating a multiway switch 10 according to an implementation of the disclosure. The multiway switch 10 is applicable to an electronic device 100. In this implementation electronic device 100 can be embodied as a terminal device. The electronic device 100 is operable in a single-frequency dual-transmit mode. The electronic device 100 includes the multiway switch 10, a radio frequency circuit 30, and an antenna system 20. The antenna system 20 includes $2^n$ antennas. The multiway switch 10 includes six T ports and $2^n$ P ports. The six T ports are configured to be coupled with the radio frequency circuit 30. The $2^n$ P ports are configured to be coupled with the $2^n$ antennas of the antenna system 20, in other words, the $2^n$ antennas and the $2^n$ P ports are coupled in one-to-one correspondence. The six T ports include two T ports coupled with all of the $2^n$ P ports. n is an integer and n≥2.

The multiway switch 10 is configured to be coupled with the radio frequency circuit 30 and the antenna system 20 to implement a preset function of the electronic device 100. The preset function is a function of transmitting an SRS through the $2^n$ antennas corresponding to the $2^n$ P ports in turn, which can be understood as a $2^n$-port SRS function.

The following describes the case where n=2, that is, four antennas and four P ports are configured, as an example. It is to be noted that, the number of the antennas and the P ports are not limited to 4, and the number thereof can be extended to $2^n$ (n being an integer and n≥2) in the implementations of the disclosure. In the case where $2^n$ antennas and $2^n$ P ports are configured, with regard to logical composition of the radio frequency circuit, physical composition of the radio frequency circuit, coupling between the independent circuit modules and the T ports, coupling between the T ports and the P ports, coupling between the P ports and the antennas, and the like, reference may be made in the following implementations. As for the principle of achieving the transmitting an SRS through the $2^n$ antennas in turn and the structure of simplified switch, reference may further be made to related descriptions in the following implementations.

Figure 1B:
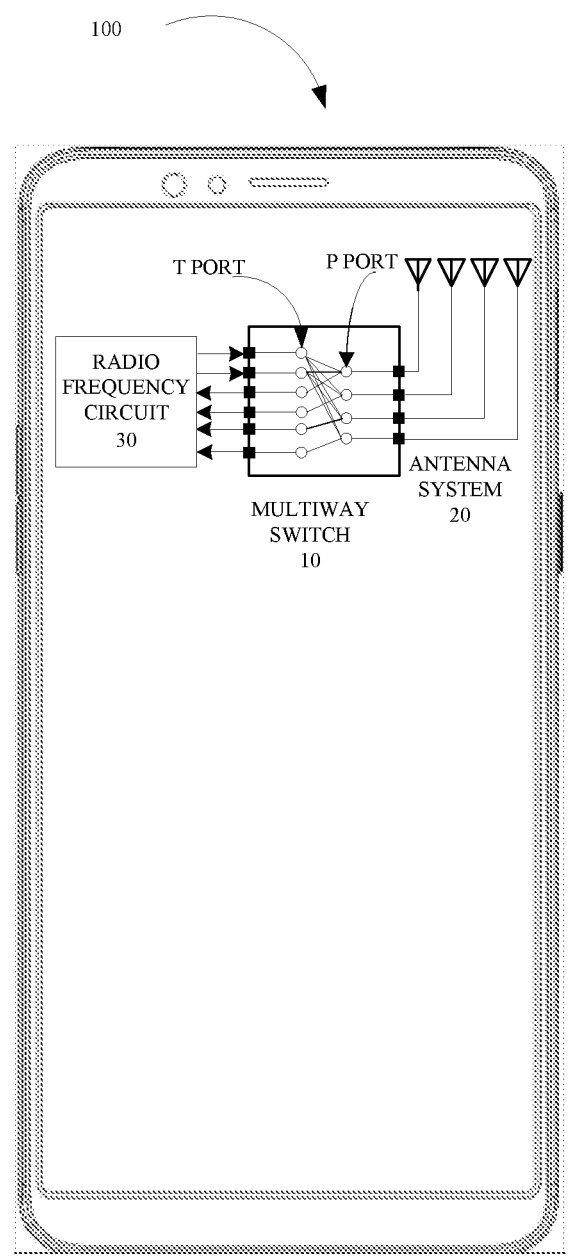
FIG. 1B is a schematic structural diagram illustrating a multiway switch according to an implementation of the disclosure.

FIG. 1B is a schematic structural diagram illustrating a multiway switch 10 according to an implementation of the disclosure. The multiway switch 10 is applicable to an electronic device 100. In this implementation electronic device 100 can be embodied as a terminal device. The electronic device 100 is operable in a single-frequency dual-transmit mode. The electronic device 100 includes the multiway switch 10, a radio frequency circuit 30, and an antenna system 20. The antenna system 20 includes four antennas. The multiway switch 10 includes six T ports and four P ports. The six T ports are configured to be coupled with the radio frequency circuit 30. The four P ports are configured to be coupled with the four antennas of the antenna system 20, in other words, the four antennas and the four P ports are coupled in one-to-one correspondence. The six T ports include two T ports coupled with all of the four P ports.

The multiway switch 10 is configured to be coupled with the radio frequency circuit 30 and the antenna system 20 to implement a preset function of the electronic device 100. The preset function is a function of transmitting an SRS through the four antennas corresponding to the four P ports in turn, which can be understood as a four-port SRS function.

The single-frequency dual-transmit mode refers to an operating mode in which the electronic device 100 can support single frequency band-dual uplink (UL) transmit paths or single frequency band-four downlink (DL) receive paths to a maximum capability.

The electronic device 100 may be a mobile phone or other terminal devices supporting the fifth generation new radio (5G NR), such as a customer premise equipment (CPE) or a mobile wireless-fidelity (MIFI). In addition, the electronic device 100 further includes a radio frequency transceiver. The radio frequency transceiver is coupled with the radio frequency circuit 30 and constitutes a radio frequency system of the electronic device 100 together with the radio frequency circuit 30, the multiway switch 10, and the antenna system 20.

The multiway switch 10 includes field-effect transistors (FET). As two T ports of the six T ports are coupled with all of the four P ports and each of other four T ports is only coupled with one fixed antenna for receiving, the number of built-in FETs, volume, and cost of the 4P4T switch can be reduced and performance can be improved. Details will be described hereinafter.

Figure 2:
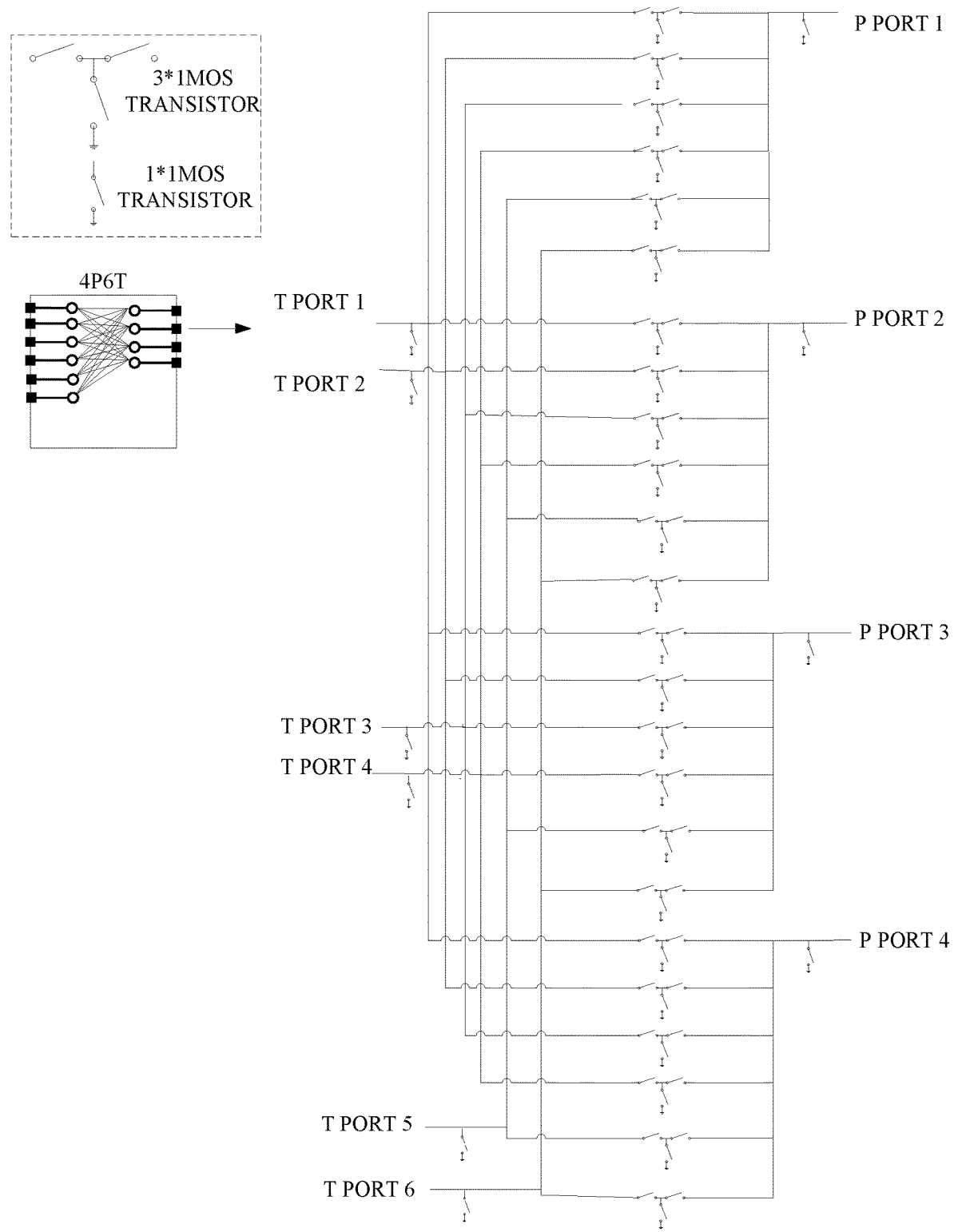
FIG. 2 is a schematic structural diagram illustrating a 4P6T full-coupling switch according to an implementation of the disclosure.
Figure 3:
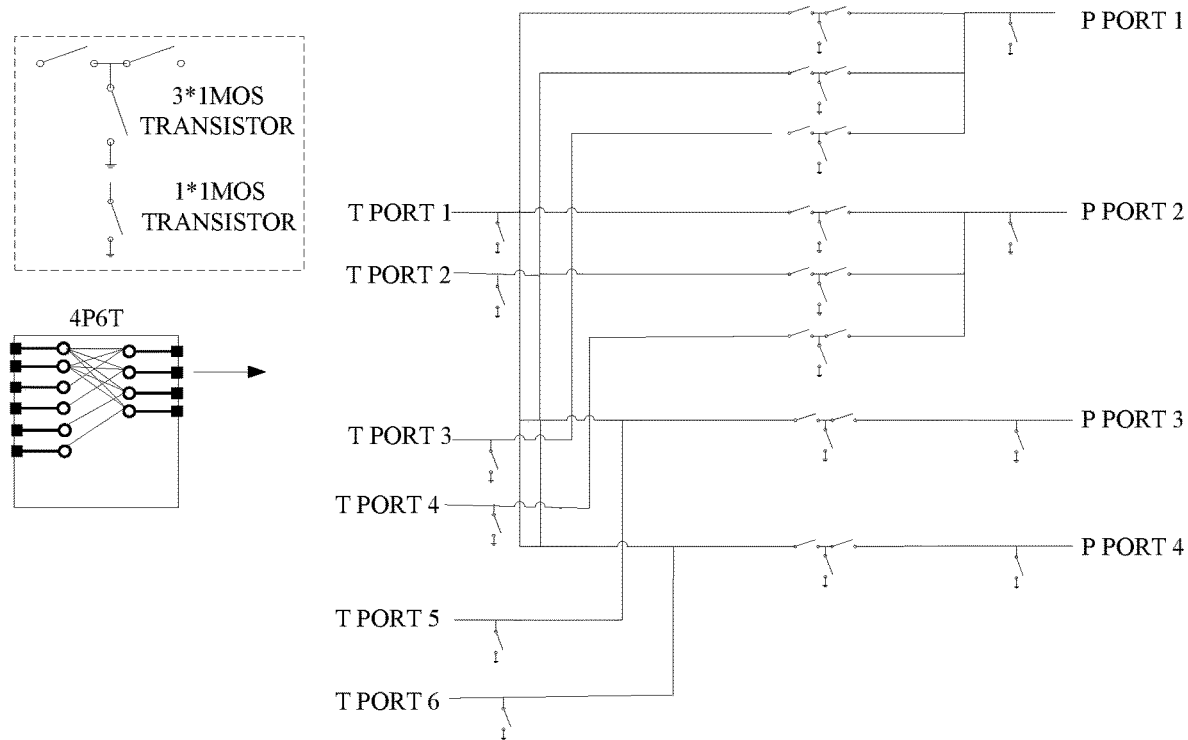
FIG. 3 is a schematic structural diagram illustrating a 4P6T simplified switch according to an implementation of the disclosure.

For example, among the six T ports, if each T port is coupled with all of the four P ports, as illustrated in FIG. 2 of a schematic structural diagram of the multiway switch 10, the number of the field-effect transistors of the multiway switch 10 is 6+6*4*3+4=82; if only two T ports of the six T ports are coupled with all of the four P ports, as illustrated in FIG. 3 of a schematic structural diagram of the multiway switch 10, the number of the field-effect transistors of the multiway switch 10 is 6+(2*4+(6-2)*1)*3+4=46.

By limiting the number of T ports that are coupled with all of the four P ports (in other words, full-coupling T ports), the number of switches of the radio frequency system of the electronic device can be effectively reduced. That is to say, the number of full-coupling T ports has a great influence on performance of the radio frequency system.

In this implementation, since the multiway switch 10 includes six T ports and four P ports and the six T ports include two T ports coupled with all of the four P ports, compared with a configuration in which all T ports are coupled with all of P ports, for the multiway switch 10 provided herein, the number of switches is reduced. That is, the number of the switches in transmit paths and/or receive paths of the radio frequency system of the electronic device 100 can be reduced, thereby reducing path loss, improving transmit power/sensitivity, data transmission rate in the 5G NR, and uplink coverage and downlink coverage of the mobile phone, and reducing power consumption and cost.

Figure 4A:
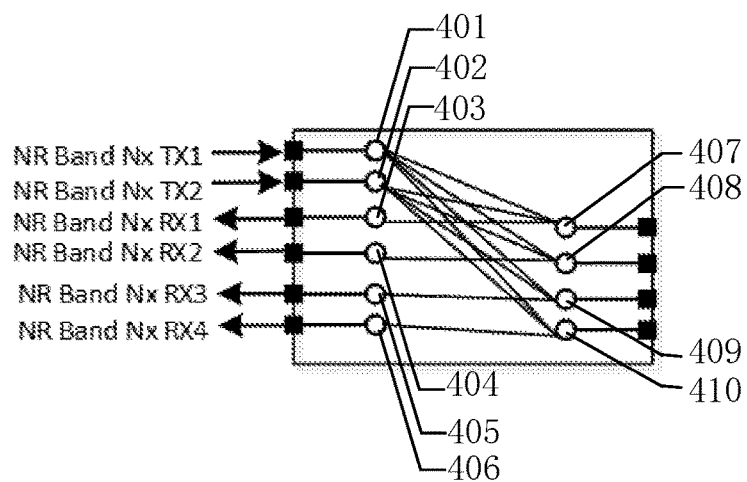
FIG. 4A is a schematic structural diagram illustrating a multiway switch of an electronic device according to an implementation of the disclosure.

As an implementation, as illustrated in FIG. 4A, FIG. 4A is a schematic structural diagram illustrating a multiway switch of an electronic device according to an implementation of the disclosure. The six T ports port 401, port 402, port 403, port 404, port 405, and port 406 of the multiway switch include two first T ports port 401 and port 402 and four second T ports port 403, port 404, port 405, port 406. Each of the two first T ports port 401 and port 402 is coupled with all of the four P ports port 407, port 408, port 409, and port 410. Each of the four second T ports port 403, port 404, port 405, port 406 is coupled with one corresponding P port of the four P ports port 407, port 408, port 409, and port 410. The first T ports are two first T ports of the six T ports that support a transmission function. The second T ports are four second T ports other than the two first T ports of the six T ports that support a reception function.

In this implementation, since the multiway switch 10 includes the first T ports and the second T ports and the number of the second T ports is not zero, compared with a configuration in which all T ports are coupled with all of P ports, for the multiway switch 10 provided herein, the number of switches is reduced. That is, the number of the switches in transmit paths and/or receive paths of the radio frequency system of the electronic device 100 can be reduced, thereby reducing path loss, improving transmit power/sensitivity, data transmission rate in the 5G NR, and uplink coverage and downlink coverage of the mobile phone, and reducing power consumption and cost.

As an implementation, the multiway switch 10 is composed of forty-six FETs.

Figure 4B:
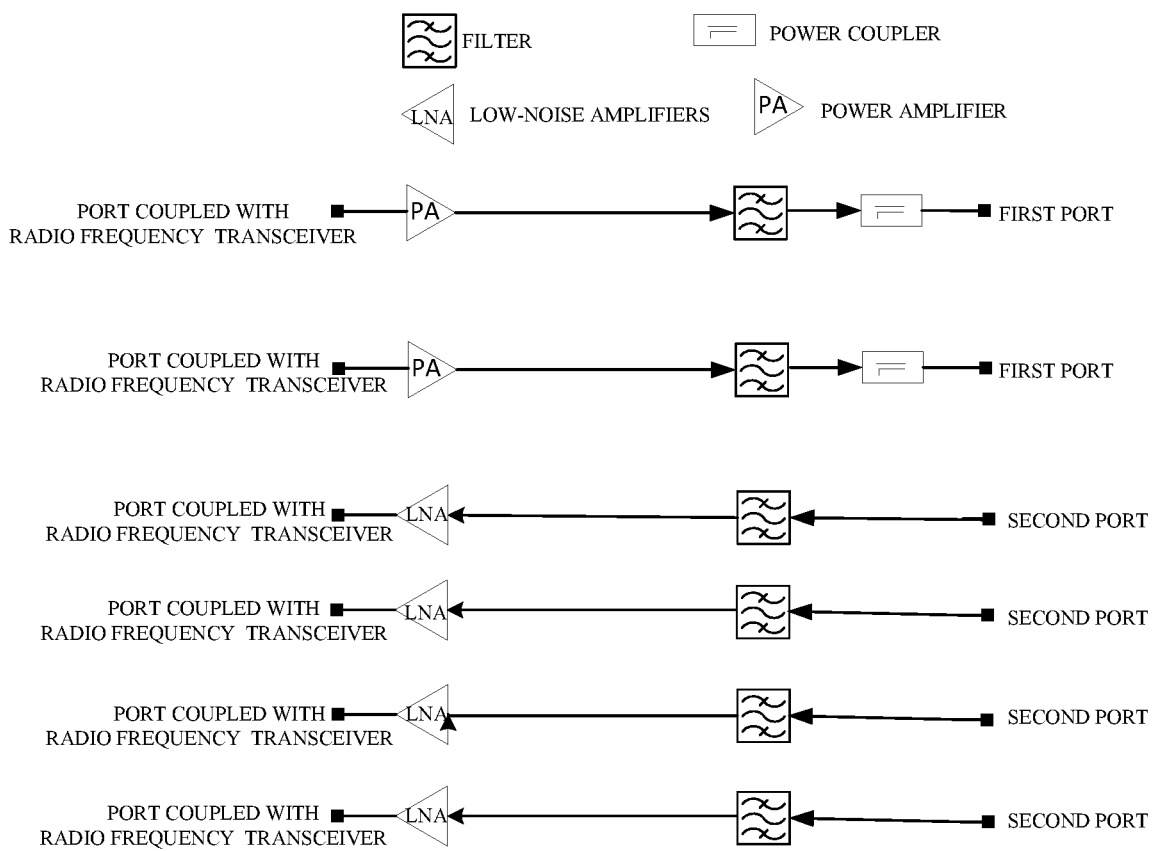
FIG. 4B is a schematic structural diagram illustrating a radio frequency circuit of an electronic device according to an implementation of the disclosure.

In the case that the electronic device 100 is operable in the single-frequency dual-transmit mode, as illustrated in FIG. 4A, FIG. 4A is a schematic structure of a corresponding multiway switch 10, and the radio frequency circuit 30 of electronic device 100 logically includes receiver circuits and two transmitter circuits. As illustrated in FIG. 4A, FIG. 4A is a schematic structure of a corresponding radio frequency circuit 30 is illustrated in FIG. 4B. and the multiway switch 10 includes six T ports. The six T ports includes two first T ports and four second T ports. The number of the FETs of the multiway switch 10 is 6+(2*4+(6−2)*1)*3+4=46. The radio frequency circuit 30 of the electronic device 100 corresponds to two first ports and four second ports. The first port is configured to be coupled with the first T port, and the second port is configured to be coupled with the second T port. The two transmitter circuits correspond to two first ports that support the transmission function and each of the two first ports is coupled with one first T port of the multiway switch 10. In addition, receiver circuits correspond to (in one-to-one correspondence with) four second ports, each second port supports the reception function, and each second port is coupled with one corresponding second T port of the multiway switch 10. The specific configuration of the transmitter circuit and the receiver circuit, and definitions related to the multiway switch 10 are similar to the foregoing implementations and will not be described herein again. In addition, it can be understood that, the matching manner of the above radio frequency circuit 30 and the multiway switch 10 includes but is not limited to the structure of the drawing, and is merely an example herein.

The multiway switch 10 of the implementation of the disclosure can enable the electronic device 100 to be operable in the single-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink coverage and downlink coverage of the mobile phone, and reducing power consumption.

As an implementation, the radio frequency circuit 30 of the electronic device 100 logically includes two transmitter circuits (can be comprehended as a circuit for transmitting and/or processing signals) and receiver circuits (can be comprehended as a circuit for receiving and/or processing signals).

The radio frequency circuit 30 physically includes two independent circuit modules.

The two independent circuit modules have transmit ports configured to be coupled with the two first T ports, in other words, the two independent circuit modules have two transmit ports each of which is configured to be coupled with one of the two first T ports. The two independent circuit modules have receive ports configured to be coupled with the four second T ports, in other words, the two first independent circuit modules have four receive ports each of which is configured to be coupled with one of the four second T ports.

As an implementation, the radio frequency circuit 30 of the electronic device 100 logically includes two transmitter circuits and receiver circuits.

The radio frequency circuit 30 physically includes three independent circuit modules.

The three independent circuit modules have transmit ports configured to be coupled with the two first T ports, in other words, the three independent circuit modules have two transmit ports each of which is configured to be coupled with one of the two first T ports. The independent circuit module has four receive ports configured to be coupled with the four second T ports, in other words, the three first independent circuit modules have four receive ports each of which is configured to be coupled with one of the four second T ports (the four receive ports are coupled in one-to-one correspondence with the four second T ports).

The transmit port of the independent circuit module corresponds to the transmit port of the transmitter circuit. The receive port of the independent circuit module corresponds to the receive port of the receiver circuit.

In this implementation, two PAs at the same frequency band operate simultaneously (corresponding to UL MIMO mode), a transmit power will be high, and signals of the two PAs will interfere with each other. In addition, the two PAs will affect heat dissipation efficiency when working at the same time. Considering this, two or three independent circuit modules are needed to set PAs in the transmitter circuits, which is beneficial to reducing interference and improving signal processing efficiency and heat dissipation efficiency of the radio frequency system.

When the radio frequency circuit 30 physically includes two independent circuit modules, example structures of the corresponding electronic device 100 can be referred to FIG. 5A to FIG. 5C, and the details will be described hereinafter.

Figure 5A:
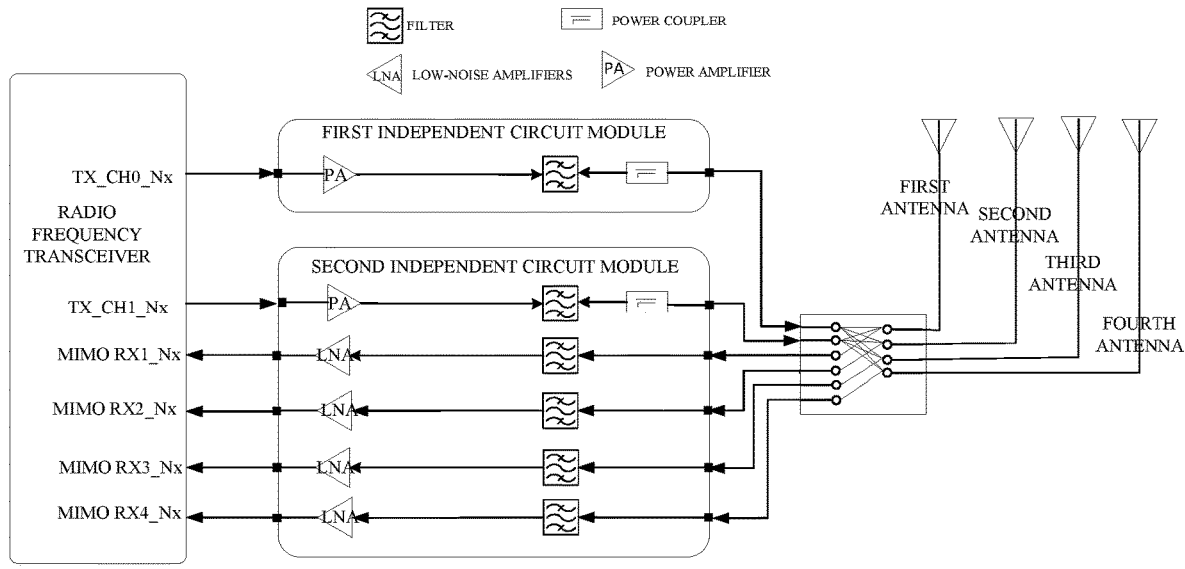
FIG. 5A is a schematic structural diagram illustrating an electronic device according to an implementation of the disclosure.

As an implementation, as illustrated in FIG. 5A, when the radio frequency circuit 30 physically includes two independent circuit modules, the two independent circuit modules include a first independent circuit module and a second independent circuit module. The first independent circuit module includes one transmitter circuit, and the second independent circuit module includes one transmitter circuit and receiver circuits.

Figure 5B:
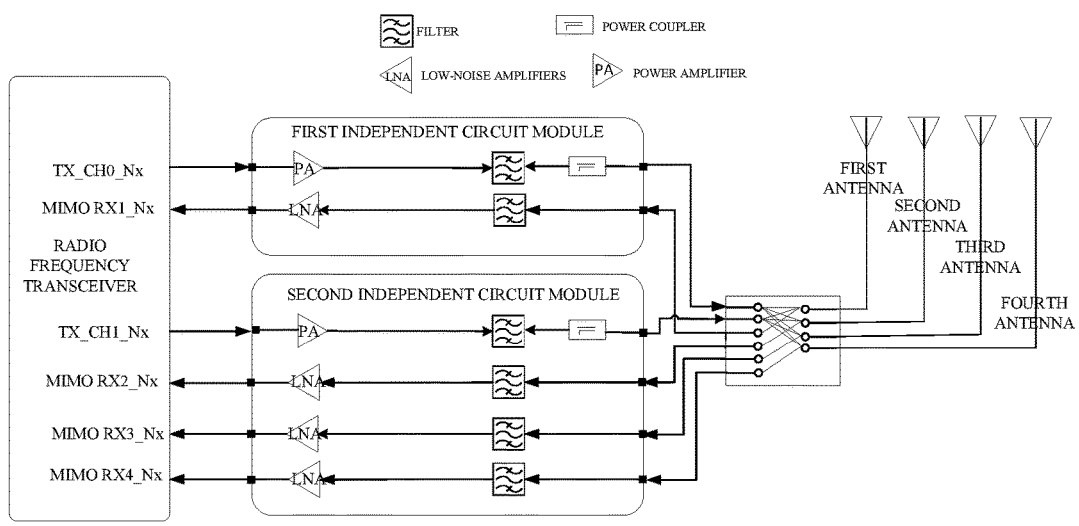
FIG. 5B is a schematic structural diagram illustrating another electronic device according to an implementation of the disclosure.

As an implementation, as illustrated in FIG. 5B, the two independent circuit modules include a first independent circuit module and a second independent circuit module. The first independent circuit module includes one transmitter circuit and one receiver circuit, and the second independent circuit module includes one transmitter circuit and three receiver circuits.

Figure 5C:
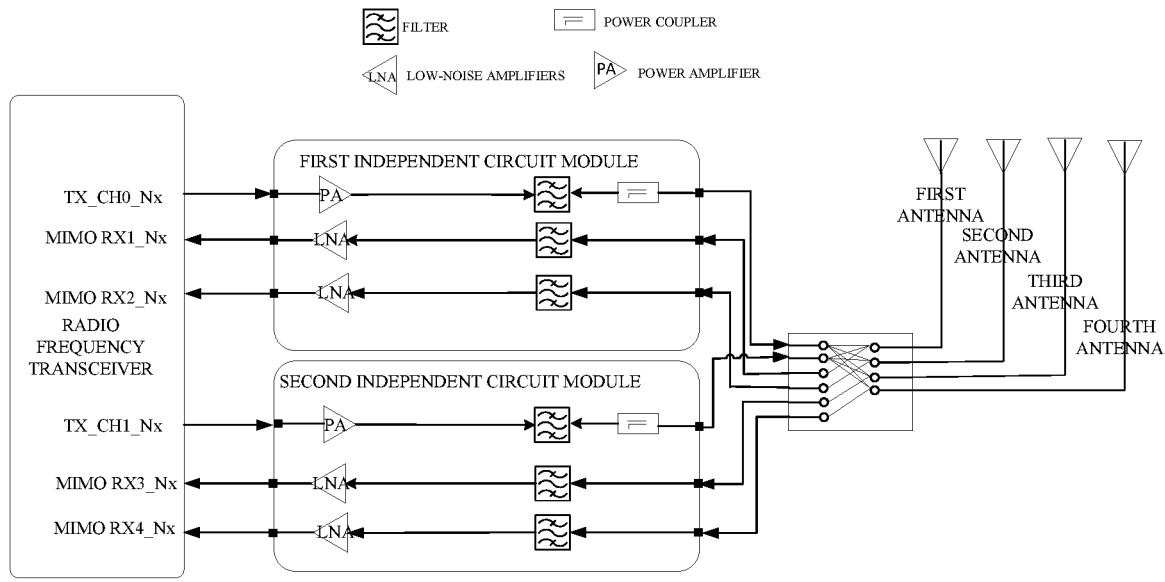
FIG. 5C is a schematic structural diagram illustrating another electronic device according to an implementation of the disclosure.

As an implementation, as illustrated in FIG. 5C, the two independent circuit modules include a first independent circuit module and a second independent circuit module. The first independent circuit module includes one transmitter circuit and two receiver circuits, and the second independent circuit module includes one transmitter circuit and two receiver circuits.

The transmitter circuit has one transmit port configured to be coupled with one first T port. The receiver circuit has one receive port configured to be coupled with one second T port.

As illustrated in FIG. 5A, when the radio frequency circuit 30 physically includes two independent circuit modules, the two independent circuit modules include a first independent circuit module and a second independent circuit module, the first independent circuit module includes one transmitter circuit, and the second independent circuit module includes one transmitter circuit and receiver circuits.

The first independent circuit module includes one transmitter circuit that is a first transmitter circuit. The first transmitter circuit has a power coupler coupled with one first T port of the multiway switch 10, and a PA coupled with a TX-CH0-NX pin (a first transmit port of a first transmit path at the NX frequency band) of the radio frequency transceiver. The second independent circuit module includes one transmitter circuit that is a second transmitter circuit. The second transmitter circuit has a power coupler coupled with another first T port of the multiway switch 10, and a PA coupled with a TX-CH1-NX pin (a second transmit port of a second transmit path at the NX frequency band) of the radio frequency transceiver. The second independent circuit module includes receiver circuit which are a first receiver circuit, a second receiver circuit, a third receiver circuit, and a fourth receiver circuit. The first receiver circuit has a filter coupled with one (a first) second T port of the multiway switch 10, and a LNA coupled with a RX1-NX pin (a first receive port at the NX frequency band) of the radio frequency transceiver. The second receiver circuit has a filter coupled with another (a second) second T port of the multiway switch 10, and a LNA coupled with a RX2-NX pin (a second receive port at the NX frequency band) of the radio frequency transceiver. The third receiver circuit has a filter coupled with another (a third) second T port of the multiway switch 10, and a LNA coupled with a RX3-NX pin (a third receive port at the NX frequency band) of the radio frequency transceiver. The fourth receiver circuit has a filter coupled with another (a fourth) second T port of the multiway switch 10, and a LNA coupled with a RX4-NX pin (a fourth receive port at the NX frequency band) of the radio frequency transceiver.

The electronic device 100 can control paths between the T ports and the P ports of the multiway switch 10 to switch on through switch transistors to achieve the preset function of transmitting an SRS through the four antennas corresponding to the four P ports in turn by the electronic device 100.

The coupling manners of a radio frequency transceiver, a radio frequency circuit 30, and a multiway switch 10 illustrated in FIG. 5B to 5C are similar with that of the radio frequency transceiver, the radio frequency circuit 30, and the multiway switch 10 illustrated in FIG. 5A, and will not be described herein.

When the radio frequency circuit 30 physically includes three independent circuit modules, example structures of the corresponding electronic device 100 can be referred to FIG. 6A to FIG. 6F, and the details will be described hereinafter.

Figure 6A:
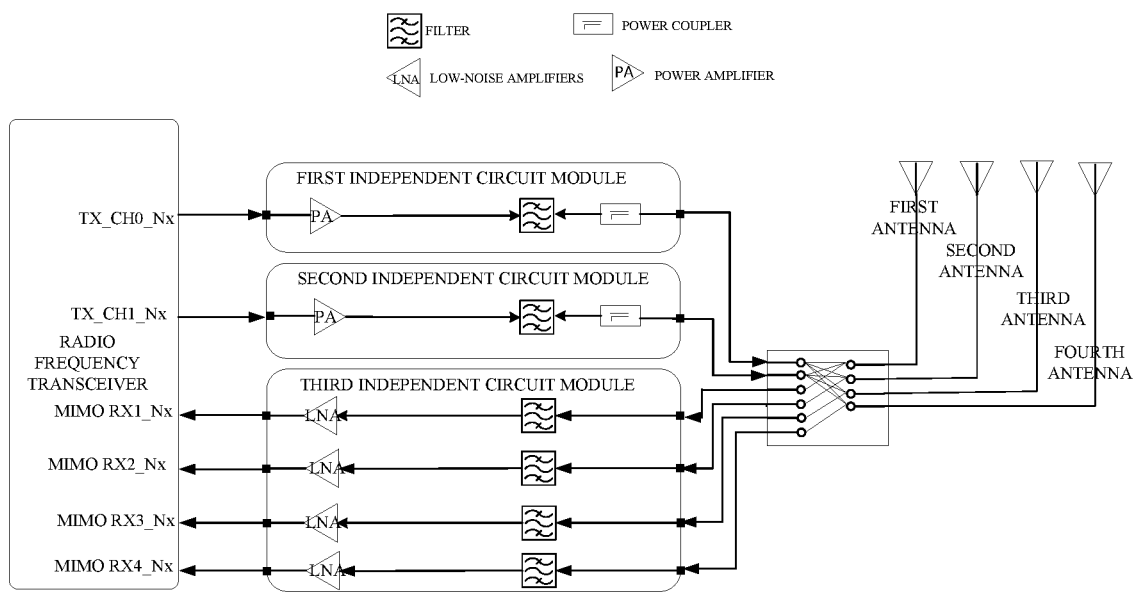
FIG. 6A is a schematic structural diagram illustrating an electronic device according to an implementation of the disclosure.

As an implementation, as illustrated in FIG. 6A, the three independent circuit modules include a first independent circuit module, a second independent circuit module, and a third independent circuit module. The first independent circuit module includes one transmitter circuit, the second independent circuit module includes one transmitter circuit, and the third independent circuit module includes receiver circuits.

Figure 6B:
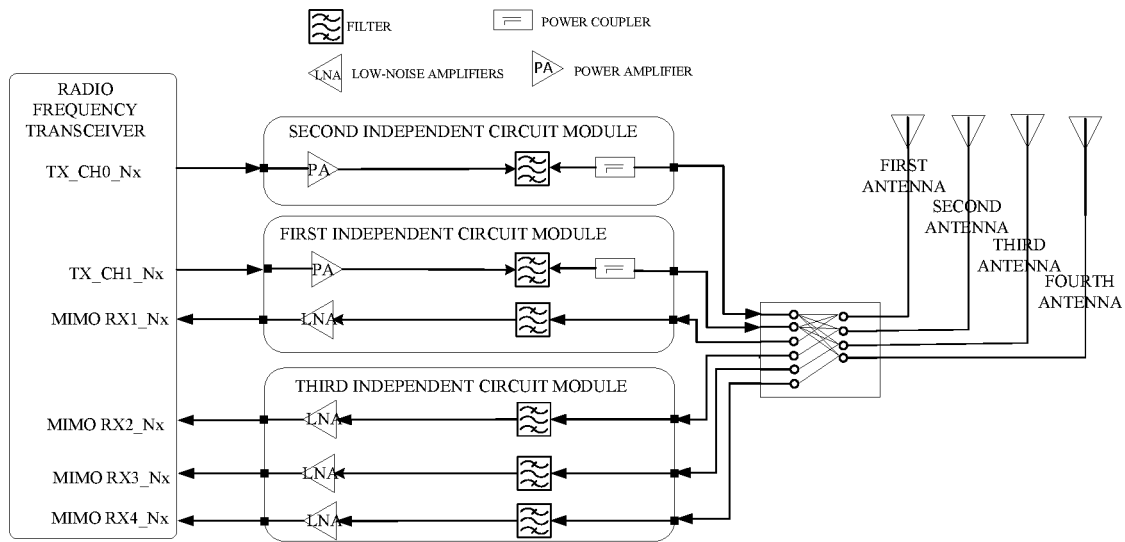
FIG. 6B is a schematic structural diagram illustrating another electronic device according to an implementation of the disclosure.

As an implementation, as illustrated in FIG. 6B, the first independent circuit module includes one transmitter circuit and one receiver circuit, the second independent circuit module includes one transmitter circuit, and the third independent circuit module includes three receiver circuits.

Figure 6C:
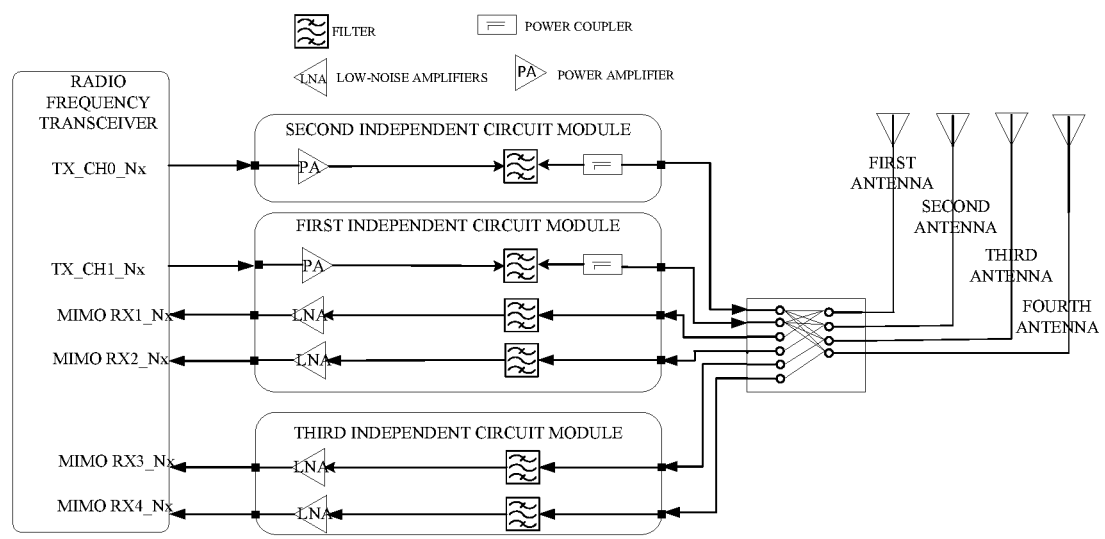
FIG. 6C is a schematic structural diagram illustrating another electronic device according to an implementation of the disclosure.

As an implementation, as illustrated in FIG. 6C, the first independent circuit module includes one transmitter circuit and two receiver circuits, the second independent circuit module includes one transmitter circuit, and the third independent circuit module includes two receiver circuits.

Figure 6D:
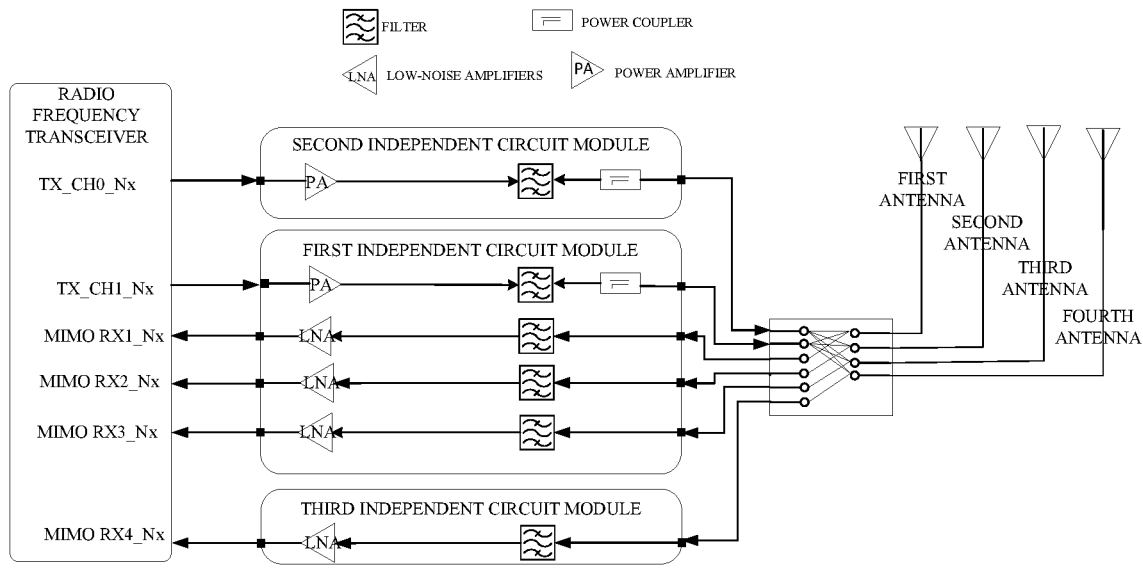
FIG. 6D is a schematic structural diagram illustrating another electronic device according to an implementation of the disclosure.

As an implementation, as illustrated in FIG. 6D, the first independent circuit module includes one transmitter circuit and three receiver circuits, the second independent circuit module includes one transmitter circuit, and the third independent circuit module includes one receiver circuit.

Figure 6E:
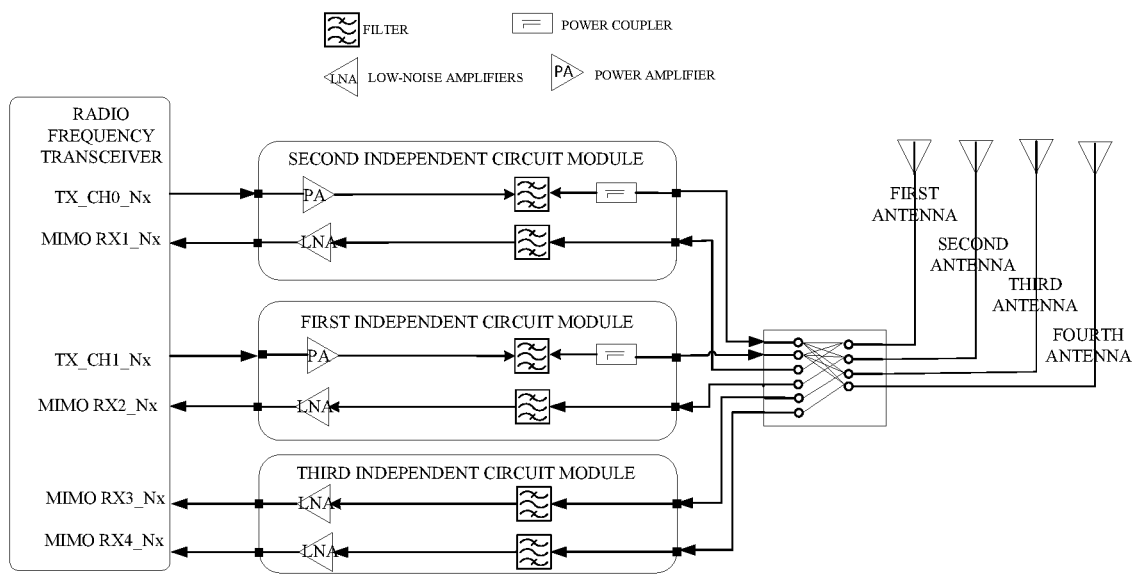
FIG. 6E is a schematic structural diagram illustrating another electronic device according to an implementation of the disclosure.

As an implementation, as illustrated in FIG. 6E, the first independent circuit module includes one transmitter circuit and one receiver circuit, the second independent circuit module includes one transmitter circuit and one receiver circuit, and the third independent circuit module includes two receiver circuits.

Figure 6F:
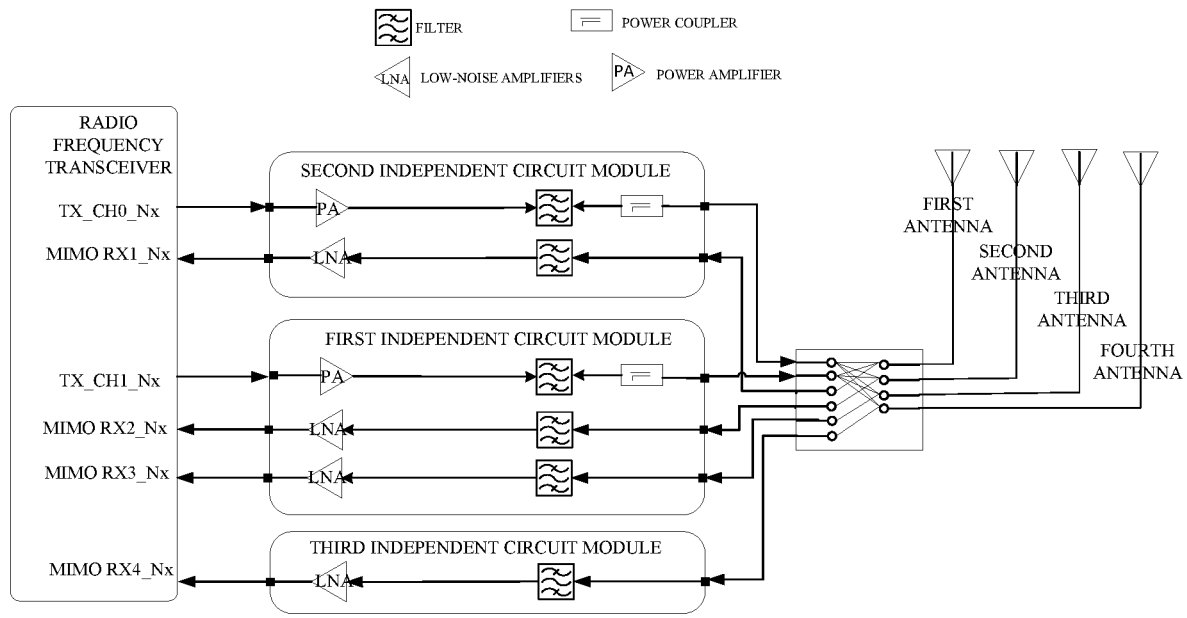
FIG. 6F is a schematic structural diagram illustrating another electronic device according to an implementation of the disclosure.

As an implementation, as illustrated in FIG. 6F, the first independent circuit module includes one transmitter circuit and two receiver circuits, the second independent circuit module includes one transmitter circuit and one receiver circuit, and the third independent circuit module includes one receiver circuit.

The transmitter circuit has one transmit port configured to be coupled with one first T port. The receiver circuit has one receive port configured to be coupled with one second T port.

As illustrated in FIG. 6A, when the radio frequency circuit 30 physically includes three independent circuit modules, the three independent circuit modules include a first independent circuit module, a second independent circuit module, and a third independent circuit module. The first independent circuit module includes one transmitter circuit, the second independent circuit module includes one transmitter circuit, and the third independent circuit module includes receiver circuits.

The first independent circuit module includes one transmitter circuit that is a first transmitter circuit. The first transmitter circuit has a power coupler coupled with the first T port of the multiway switch 10, and a PA coupled with a TX-CH0-NX pin (a first transmit port of the first transmit path at the NX frequency band) of the radio frequency transceiver. The second independent circuit module includes one transmitter circuit that is a second transmitter circuit. The second transmitter circuit has a power coupler coupled with another first T port of the multiway switch 10, and a PA coupled with a TX-CH1-NX pin (a second transmit port of the second transmit path at the NX frequency band) of the radio frequency transceiver. The third independent circuit module includes four reception which are a first receiver circuit, a second receiver circuit, a third receiver circuit, and a fourth receiver circuit. The first receiver circuit has a filter coupled with one (a first) second T port of the multiway switch 10, and a LNA coupled with a RX1-NX pin (a first receive port at the NX frequency band) of the radio frequency transceiver. The second receiver circuit has a filter coupled with another (a second) second T port of the multiway switch 10, and a LNA coupled with a RX2-NX pin (a second receive port at the NX frequency band) of the radio frequency transceiver. The third receiver circuit has a filter coupled with another (a third) second T port of the multiway switch 10, and a LNA coupled with a RX3-NX pin (a third receive port at the NX frequency band) of the radio frequency transceiver. The fourth receiver circuit has a filter coupled with another (a fourth) second T port of the multiway switch 10, and a LNA coupled with a RX4-NX pin (a fourth receive port at the NX frequency band) of the radio frequency transceiver.

The electronic device 100 can control paths between the T ports and the P ports of the multiway switch 10 to switch on through switch transistors to achieve the preset function of transmitting an SRS through the four antennas corresponding to the four P ports in turn by the electronic device 100.

The coupling manners of a radio frequency transceiver, a radio frequency circuit 30, and a multiway switch 10 illustrated in FIG. 5B to 5F are similar with that of the radio frequency transceiver, the radio frequency circuit 30, and the multiway switch 10 illustrated in FIG. 6A, and will not be described herein.

In this implementation, two PAs at the same frequency band operate simultaneously (corresponding to UL MIMO mode), a transmit power will be high, and signals of the two PAs will interfere with each other. In addition, the two PAs will affect heat dissipation efficiency when working at the same time. Considering this, multiple independent circuit modules are needed to set PAs in the transmitter circuits. Since low-noise amplifiers (LNA) in receiver circuits can operate simultaneously, due to their low power and low power consumption, mutual influence can be avoided through design. Therefore, multiple LNAs in multiple receiver circuits at the same frequency band can be disposed in the same circuit module.

The transmitter circuit involved in the implementations of the present disclosure includes a power amplifier (PA), a filter, and a power coupler. The PA is coupled with the filter. The filter is coupled with the power coupler. The power coupler is configured to be coupled with the one first T port of the multiway switch. The PA is configured to be coupled with the radio frequency transceiver.

The receiver circuit involved in the implementations of the present disclosure includes a LNA and a filter. The LNA is coupled with the filter. The filter is configured to be coupled with one second T port of the multiway switch. The LNA is configured to be coupled with the radio frequency transceiver.

The transmit port of the transmitter circuit corresponds to the transmit port of the independent circuit module. The transmit port of the transmitter circuit is configured to be coupled with a corresponding first T port. The receive port of the receiver circuit corresponds to the receive port of the independent circuit module. The receive port of the receiver circuit is configured to be coupled with a corresponding second T port.

It can be understood that, the above-mentioned receiver circuits and transmitter circuits can be implemented in various manners. The implementations of the disclosure are not particularly restricted.

In one possible implementation, the four antennas include a first antenna, a second antenna, a third antenna, and a fourth antenna. These four antennas are all operable at a fifth generation new radio (5G NR) frequency band.

The 5G NR frequency band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas operable at the 5G NR frequency band.

The first antenna and fourth antenna are intended to support DL 4×4 MIMO for some frequency bands on LTE terminals. These two receive antennas are shared with the antennas of 5G NR (hereinafter, "shared antennas" for short). The LTE frequency band may include, for example, 1880-1920 MHz and 2496-2690 MHz.

Figure 7:
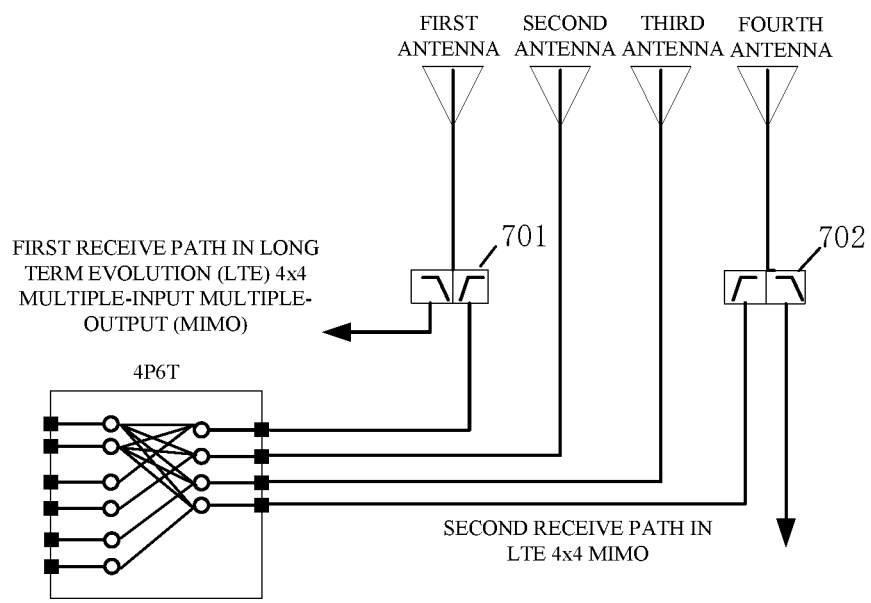
FIG. 7 is a schematic structural diagram illustrating an antenna system of an electronic device according to an implementation of the disclosure.

In one possible implementation, as illustrated in FIG. 7, the antenna system further includes a first combiner 701 and a second combiner 702.

The first combiner 701 has a first port configured to be coupled with the first antenna, a second port configured to be coupled with a first receive path in LTE 4×4 multiple-input multiple-output (MIMO) configuration of the electronic device 100, and a third port configured to be coupled with a corresponding P port of the multiway switch 10.

The second combiner 702 has a first port configured to be coupled with the fourth antenna, a second port configured to be coupled with a second receive path in the LTE 4×4 MIMO of the electronic device 100, and a third port configured to be coupled with a corresponding P port of the multiway switch 10.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the electronic device 100 will arrange one antenna with better performance for the circuit for PRX (primary receiver), and the antenna will in a standby state. Moreover, first T ports of the switch having the transmission-reception function can be configured for TX (transmit) and PRX purpose, and thus the antenna can be switched arbitrarily. In this way, there is no need to restrict the coupling between ports of shared antennas.

Figure 8:
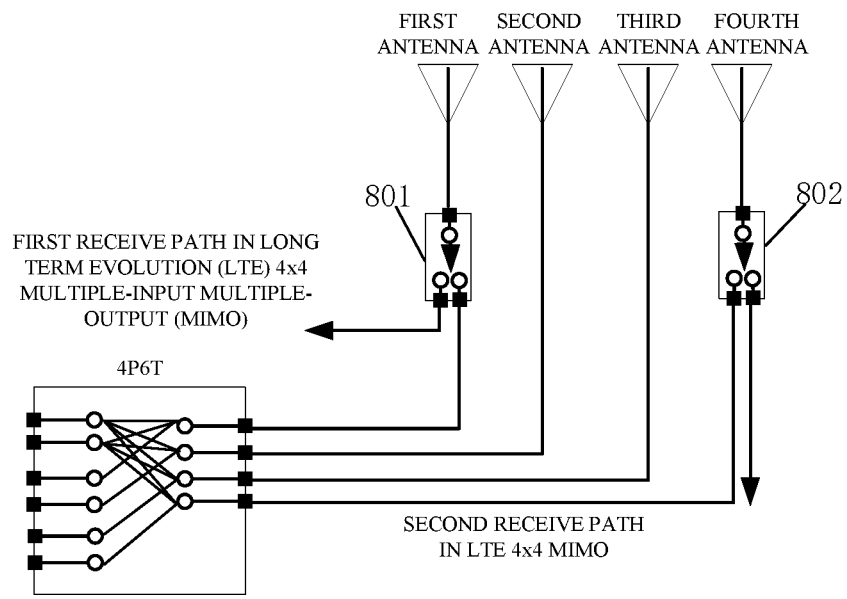
FIG. 8 is a schematic structural diagram illustrating another antenna system of an electronic device according to an implementation of the disclosure.

As an implementation, as illustrated in FIG. 8, the antenna system 20 further includes a first single-pole double-throw (SPDT) switch 801 and a second SPDT switch 802. The first SPDT switch 801 has a first port configured to be coupled with the first antenna, a second port configured to be coupled with a first receive path in LTE 4×4 multiple-input multiple-output (MIMO) configuration of the electronic device 100, and a third port configured to be coupled with a corresponding P port of the multiway switch 10. The second SPDT switch 802 has a first port configured to be coupled with the fourth antenna, a second port configured to be coupled with a second receive path in the LTE 4×4 MIMO of the electronic device 100, and a third port configured to be coupled with a corresponding P port of the multiway switch 10.

The schemes of the disclosure can be combined or replaced with each other. For example, the antenna system and/or the multiway switch described above can be applied or combined into the radio frequency system and the electronic device below. It is to be noted that, "the antenna system and/or the multiway switch" of the disclosure means "the antenna system", "the multiway switch", or "the antenna system and the multiway switch".

Figure 9:
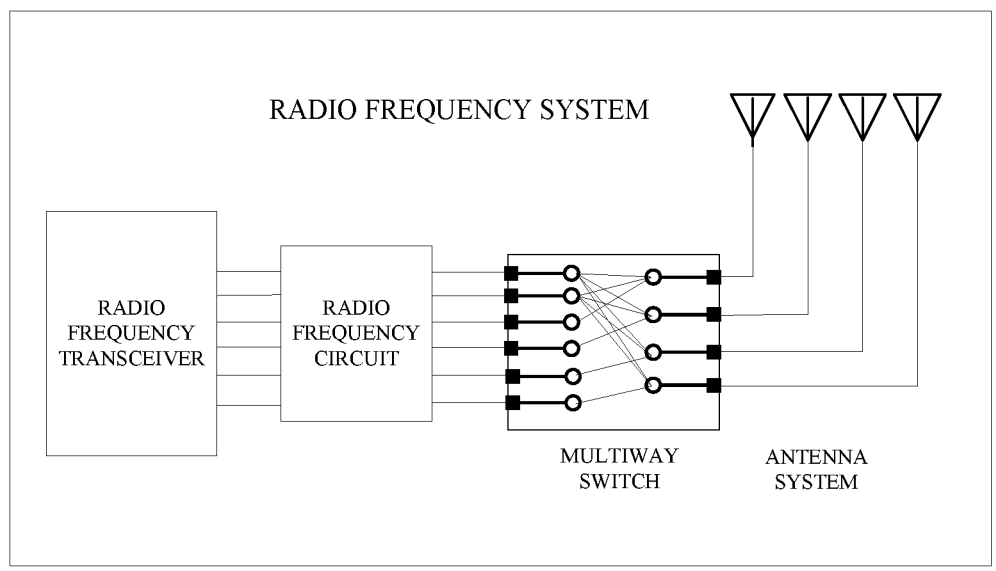
FIG. 9 is a schematic structural diagram illustrating a radio frequency system according to an implementation of the disclosure.

FIG. 9 is a schematic structural diagram illustrating a radio frequency system according to an implementation of the disclosure. The radio frequency system includes an antenna system, a radio frequency circuit, and the multiway switch according to any of the implementations above.

The multiway switch includes six T ports and four P ports. The six T ports are configured to be coupled with the radio frequency circuit. The four P ports are configured to be coupled with the antenna system. The six T ports include two first T ports coupled with all of the four P ports.

The multiway switch is configured to be coupled with the radio frequency circuit and the antenna system to implement a preset function of the radio frequency system. The antenna system includes four antennas. The preset function is a function of transmitting an SRS through the four antennas corresponding to the four P ports in turn.

As an implementation, the six T ports further comprise four second T ports. Each of the four second T ports is coupled with one corresponding P port of the four P ports. The two first T ports of the six T ports support a transmission function. The four second T ports other than the two first T ports of the six T ports support only a reception function.

Figure 10:
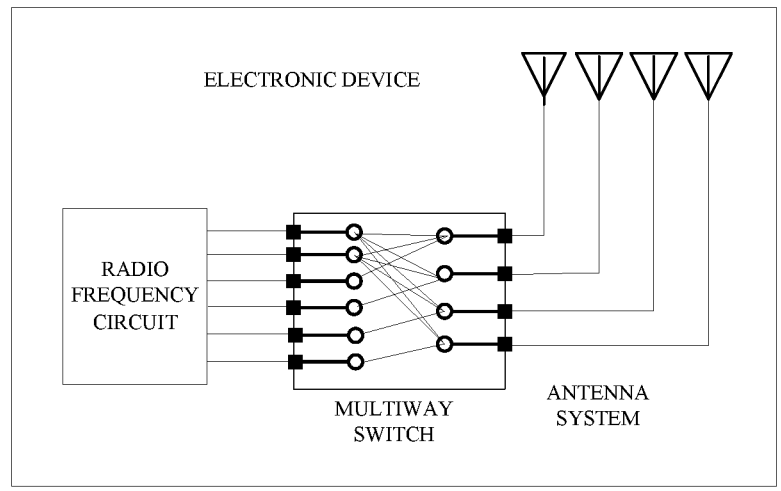
FIG. 10 is a schematic structural diagram illustrating an electronic device according to an implementation of the disclosure.

FIG. 10 is a schematic structural diagram illustrating an electronic device according to an implementation of the disclosure. The electronic device includes an antenna system, a radio frequency circuit, and the multiway switch described in any of the implementations above.

The multiway switch includes six T ports and four P ports. The six T ports are configured to be coupled with the radio frequency circuit. The four P ports are configured to be coupled with the antenna system. The six T ports include two first T ports coupled with all of (that is, fully coupled with) the four P ports.

The multiway switch is configured to be coupled with the radio frequency circuit and the antenna system to implement a preset function of the electronic device. The antenna system includes four antennas. The preset function is a function of transmitting an SRS through the four antennas corresponding to the four P ports in turn.

The electronic device includes at least one of an electronic device and a base station.

Figure 11:
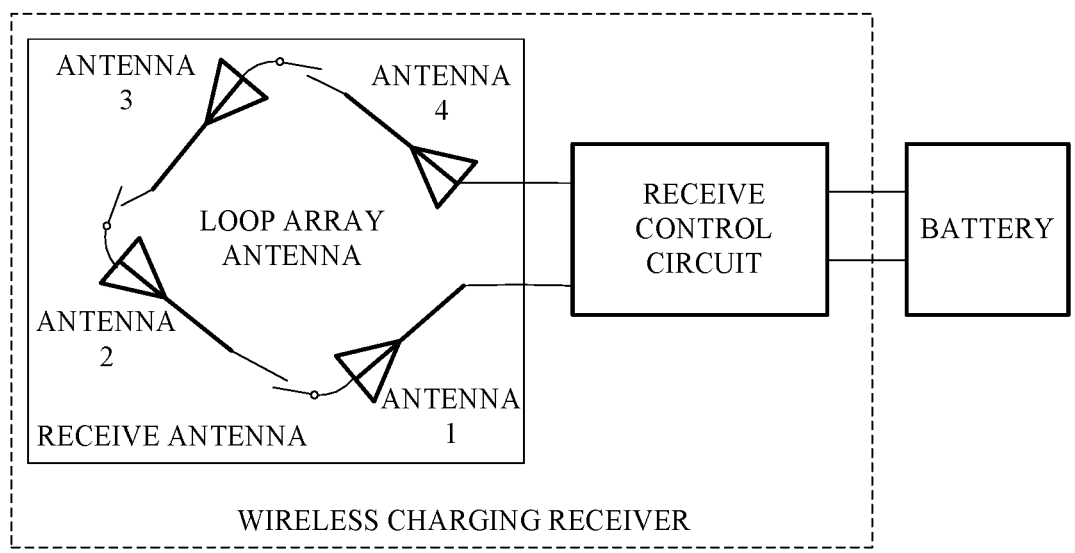
FIG. 11 is a schematic diagram illustrating a wireless charging receiver for multiplexing an antenna of an electronic device according to an implementation of the disclosure.

In addition, as illustrated in FIG. 11, the four antennas in the antenna system described in the implementations of the disclosure can also be multiplexed by a wireless charging receiver of the electronic device 100. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. As one implementation, the receive control circuit interacts with the wireless charging transmitter in real time on a frequency change range to implement an "exclusive encryption" wireless charging mode.

The receive antenna may be an antenna includes at least one of the four antennas (in the case of multiple antennas, the multiple antennas are strobed via switches).

Figure 12:
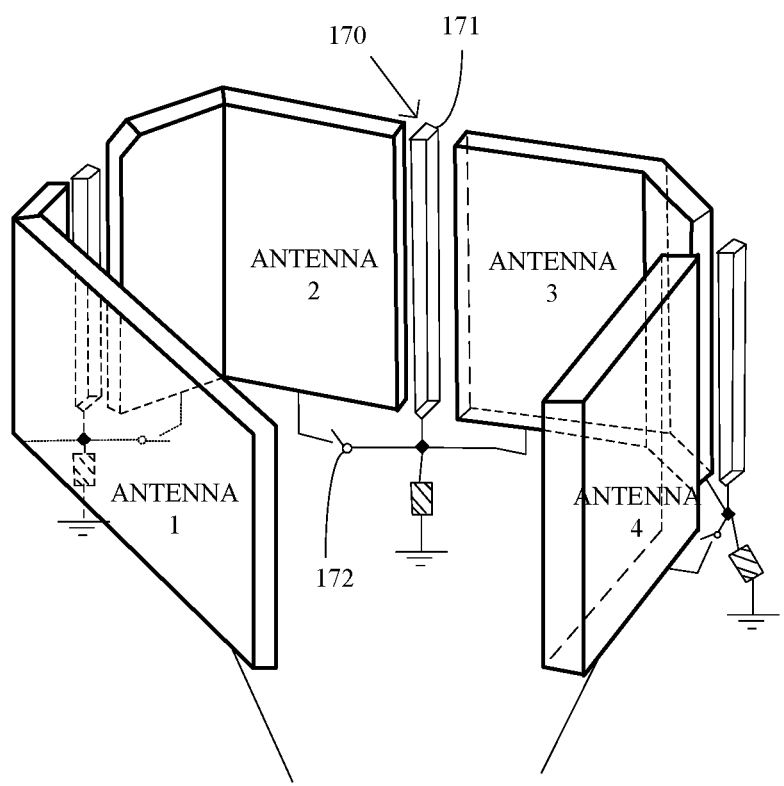
FIG. 12 is a schematic structural diagram illustrating a loop array antenna including four antennas according to an implementation of the disclosure.

For example, as illustrated in FIG. 12, the receive antenna is a loop array antenna including the four antennas described above. The four antennas include antenna 1, antenna 2, antenna 3, and antenna 4. Antenna 1 and antenna 4 are operable at both a LTE frequency band and a 5G NR frequency band, while antenna 2 and antenna 3 are operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device 100 can conduct the switch 172 of each gate circuit 170 in a wireless charging mode to form a loop array antenna to receive energy. By adding the spacers 171 among the antennas, the gate circuit 170 can reduce mutual coupling among the multiple antennas of the electronic device 100 in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since antenna 1 and antenna 4 have capabilities stronger than that of antenna 2 and antenna 3, the loop array antenna thus arranged can reduce energy loss in transmission as much as possible.

As can be seen, for the transmit paths and the receive paths of the radio frequency system of the electronic device, the transmit paths can include one single independent switch (a 4P6T switch) or two independent switches (a SPDT switch and a 4P6T switch), and the receive paths can include one single independent switch (a 4P6T switch) or two independent switches (a SPDT switch and a 4P6T switch). That is to say, by integrating more switch functions of the transmit paths and the receive paths of the radio frequency system into the 4P6T switch, the number of independent switches of the transmit paths and the receive paths can be effectively reduced.

In the implementations of the present disclosure, a radio frequency system is provided. The radio frequency system includes an antenna system, a radio frequency circuit, and the multiway switch described in the above implementations.

The multiway switch is configured to be coupled with the radio frequency circuit and the antenna system to implement a preset function of the radio frequency system, and the preset function is a function of transmitting an SRS through the four antennas corresponding to the four P ports in turn.

In the implementations of the present disclosure, an electronic device is provided. The electronic communication device includes an antenna system, a radio frequency circuit, and the multiway switch described in the above implementations.

The multiway switch is configured to be coupled with the radio frequency circuit and the antenna system to implement a preset function of the electronic device, and the preset function is a function of transmitting an SRS through the four antennas corresponding to the four P ports in turn.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, applicable to an electronic device being operable in a single-frequency dual-transmit mode and the electronic device comprising the multiway switch, a radio frequency circuit, and an antenna system, the multiway switch comprising:
 six T ports and $2^n$ P ports, the six T ports being configured to be coupled with the radio frequency circuit, the $2^n$ P ports being configured to be coupled with the antenna system, and the six T ports comprising two first T ports coupled with all of the $2^n$ P ports; n being an integer and n≥2; and
 the multiway switch being configured to be coupled with the radio frequency circuit and the antenna system to implement a preset function of the electronic device, the antenna system comprising $2^n$ antennas, and the preset function being a function of transmitting a sounding reference signal (SRS) through the $2^n$ antennas corresponding to the $2^n$ P ports in turn, wherein:
 the six T ports further comprise four second T ports;
 each of the four second T ports is coupled with one corresponding P port of the $2^n$ P ports;
 the two first T ports support a transmission function; and
 the four second T ports support only a reception function.

2. The multiway switch of any of claim 1, wherein:
 when n=2, the radio frequency circuit of the electronic device logically comprises two transmitter circuits and four receiver circuits;
 the radio frequency circuit physically comprises two independent circuit modules;
 the two independent circuit modules have transmit ports configured to be coupled with the two first T ports; and
 the two independent circuit modules have receive ports configured to be coupled with the four second T ports.

3. The multiway switch of claim 2, wherein:
 the two independent circuit modules comprise a first independent circuit module and a second independent circuit module;
 the first independent circuit module comprises one transmitter circuit, and the second independent circuit module comprises one transmitter circuit and four receiver circuits;
 each transmitter circuit has one transmit port configured to be coupled with one of the two first T port; and
 each receiver circuit has one receive port configured to be coupled with one of the four second T port.

4. The multiway switch of claim 2, wherein:
 the two independent circuit modules comprise a first independent circuit module and a second independent circuit module;
 the first independent circuit module comprises one transmitter circuit and one receiver circuit, and the second independent circuit module comprises one transmitter circuit and three receiver circuits;
 each transmitter circuit has one transmit port configured to be coupled with one of the two first T port; and
 each receiver circuit has one receive port configured to be coupled with one of the four second T port.

5. The multiway switch of claim 2, wherein:
 the two independent circuit modules comprise a first independent circuit module and a second independent circuit module;
 the first independent circuit module comprises one transmitter circuit and two receiver circuits, and the second independent circuit module comprises one transmitter circuit and two receiver circuits;
 each transmitter circuit has one transmit port configured to be coupled with one of the two first T port; and
 each receiver circuit has one receive port configured to be coupled with one of the four second T port.

6. The multiway switch of claim 1, wherein:
 when n=2, the radio frequency circuit of the electronic device logically comprises two transmitter circuits and four receiver circuits;
 the radio frequency circuit physically comprises three independent circuit modules;
 the three independent circuit modules have transmit ports configured to be coupled with the two first T ports; and
 the three independent circuit modules have receive ports configured to be coupled with the four second T ports.

7. The multiway switch of claim 6, wherein:
 the three independent circuit modules comprise a first independent circuit module, a second independent circuit module, and a third independent circuit module;
 the first independent circuit module comprises one transmitter circuit, the second independent circuit module comprises one transmitter circuit, and the third independent circuit module comprises four receiver circuits;
 each transmitter circuit has one transmit port configured to be coupled with one of the two first T port; and
 each receiver circuit has one receive port configured to be coupled with one of the four second T port.

8. The multiway switch of claim 6, wherein:
 the three independent circuit modules comprise a first independent circuit module, a second independent circuit module, and a third independent circuit module;
 the first independent circuit module comprises one transmitter circuit and one receiver circuit, the second independent circuit module comprises one transmitter circuit, and the third independent circuit module comprises three receiver circuits;
 each transmitter circuit has one transmit port configured to be coupled with one of the two first T port; and
 each receiver circuit has one receive port configured to be coupled with one of the four second T port.

9. The multiway switch of claim 6, wherein:
 the three independent circuit modules comprise a first independent circuit module, a second independent circuit module, and a third independent circuit module;
 the first independent circuit module comprises one transmitter circuit and two receiver circuits, the second independent circuit module comprises one transmitter circuit, and the third independent circuit module comprises two receiver circuits;
 each transmitter circuit has one transmit port configured to be coupled with one of the two first T port; and
 each receiver circuit has one receive port configured to be coupled with one of the four second T port.

10. The multiway switch of claim 6, wherein:
 the three independent circuit modules comprise a first independent circuit module, a second independent circuit module, and a third independent circuit module;

the first independent circuit module comprises one transmitter circuit and three receiver circuits, the second independent circuit module comprises one transmitter circuit, and the third independent circuit module comprises one receiver circuit;

each transmitter circuit has one transmit port configured to be coupled with one of the two first T port; and each receiver circuit has one receive port configured to be coupled with one of the four second T port.

11. The multiway switch of claim 6, wherein:

the three independent circuit modules comprise a first independent circuit module, a second independent circuit module, and a third independent circuit module;

the first independent circuit module comprises one transmitter circuit and one receiver circuit, the second independent circuit module comprises one transmitter circuit and one receiver circuit, and the third independent circuit module comprises two receiver circuits;

each transmitter circuit has one transmit port configured to be coupled with one of the two first T port; and each receiver circuit has one receive port configured to be coupled with one of the four second T port.

12. The multiway switch of claim 6, wherein:

the three independent circuit modules comprise a first independent circuit module, a second independent circuit module, and a third independent circuit module;

the first independent circuit module comprises one transmitter circuit and two receiver circuits, the second independent circuit module comprises one transmitter circuit and one receiver circuit, and the third independent circuit module comprises one receiver circuit;

each transmitter circuit has one transmit port configured to be coupled with one of the two first T port; and each receiver circuit has one receive port configured to be coupled with one of the four second T port.

13. The multiway switch of claim 1, wherein:

when n=2, the $2^n$ (four) antennas comprise a first antenna, a second antenna, a third antenna, and a fourth antenna; and the first antenna, the second antenna, the third antenna, and the fourth antenna are antennas operable at a fifth generation new radio (5G NR) frequency band.

14. The multiway switch of claim 1, wherein:

when n=2, the $2^n$ (four) antennas comprise a first antenna, a second antenna, a third antenna, and a fourth antenna;

the first antenna and the fourth antenna are antennas operable at a long term evolution (LTE) frequency band and a fifth generation new radio (5G NR) frequency band; and the second antenna and the third antenna are antennas operable at the 5G NR frequency band.

15. The multiway switch of claim 14, wherein the antenna system further comprises a first combiner and a second combiner, wherein:

the first combiner has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch; and the second combiner has a first port configured to be coupled with the fourth antenna, a second port configured to be coupled with a second receive path in the LTE 4×4 MIMO of the electronic device, and a third port configured to be coupled with a corresponding P port of the multiway switch.

16. The multiway switch of claim 14, wherein the antenna system further comprises a first single-pole double-throw (SPDT) switch and a second SPDT switch, wherein:

the first SPDT switch has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch; and the second SPDT switch has a first port configured to be coupled with the fourth antenna, a second port configured to be coupled with a second receive path in the LTE 4×4 MIMO of the electronic device, and a third port configured to be coupled with a corresponding P port of the multiway switch.

17. A radio frequency system, comprising:

an antenna system, a radio frequency circuit, and a multiway switch;

the antenna system comprising $2^n$ antennas; n being an integer and n≥2;

the multiway switch comprising six T ports and $2^n$ P ports, the six T ports being configured to be coupled with the radio frequency circuit, the $2^n$ P ports being configured to be coupled with the antenna system, and the six T ports comprising two first T ports coupled with all of the $2^n$ P ports; and the multiway switch being configured to be coupled with the radio frequency circuit and the antenna system to implement a preset function of the radio frequency system and the preset function being a function of transmitting a sounding reference signal (SRS) through the $2^n$ antennas corresponding to the $2^n$ P ports in turn, wherein:

the six T ports further comprise four second T ports;

each of the four second T ports is coupled with one corresponding P port of the $2^n$ P ports;

the two first T ports support a transmission function; and the four second T ports support only a reception function.

18. An electronic device, comprising:

an antenna system, a radio frequency circuit, and a multiway switch;

the antenna system comprising $2^n$ antennas; n being an integer and n≥2;

the multiway switch comprising six T ports and $2^n$ P ports, the six T ports being configured to be coupled with the radio frequency circuit, the $2^n$ P ports being configured to be coupled with the antenna system, and the six T ports comprising two first T ports coupled with all of the $2^n$ P ports; and the multiway switch being configured to be coupled with the radio frequency circuit and the antenna system to implement a preset function of the electronic device and the preset function being a function of transmitting a sounding reference signal (SRS) through the $2^n$ antennas corresponding to the $2^n$ P ports in turn, wherein:

the six T ports further comprise four second T ports;

each of the four second T ports is coupled with one corresponding P port of the $2^n$ P ports;

the two first T ports support a transmission function; and the four second T ports support only a reception function.

* * * * *